United States Patent [19]

Bok

[11] Patent Number: 4,585,096
[45] Date of Patent: Apr. 29, 1986

[54] BRAKE APPARATUS

[75] Inventor: Lowell D. Bok, Anna, Ohio

[73] Assignee: The B. F. Goodrich Company, Akron, Ohio

[21] Appl. No.: 637,357

[22] Filed: Aug. 3, 1984

[51] Int. Cl.[4] ............................................. F16D 65/06
[52] U.S. Cl. ................................ 188/73.37; 188/71.5; 192/107 C
[58] Field of Search ............... 188/73.2, 73.37, 218 A, 188/250 E, 71.5, 73.35, 73.36; 192/107 C, 107 M

[56] References Cited

U.S. PATENT DOCUMENTS 3,357,519  12/1967  Anderson et al. ............. 188/218 A
3,509,973  5/1970   Kimata ........................ 188/218 A

FOREIGN PATENT DOCUMENTS 2658427    6/1978  Fed. Rep. of Germany ..... 188/73.2
WO80/00735 4/1980  Int'l Pat. Institute ......... 188/218 A Primary Examiner—Duane A. Reger
Attorney, Agent, or Firm—Joseph Januszkiewicz

[57] ABSTRACT

A split disc for a brake or clutch in which a separator disc member is positioned for frictional engagement with adjacent disc members that form an integral disc. The separator disc member is thin relative to adjacent spaced disc members suppressing noise and vibration to enhance dissipation of heat.

5 Claims, 5 Drawing Figures

U.S. Patent  Apr. 29, 1986  Sheet 2 of 2  4,585,096
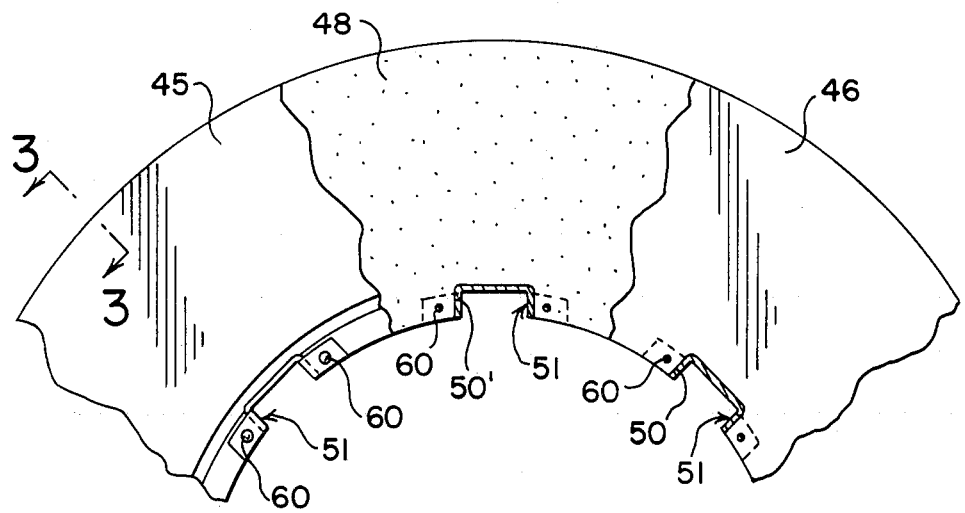
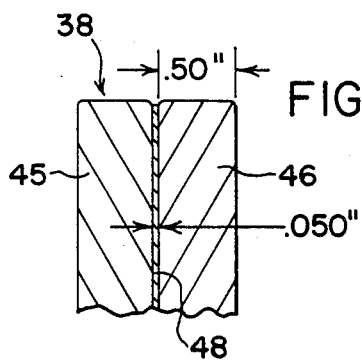
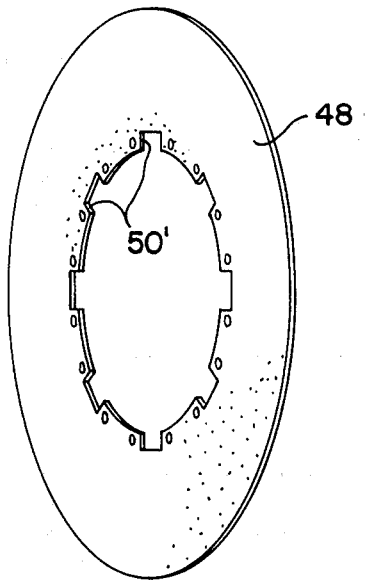

BRAKE APPARATUS

BACKGROUND OF THE INVENTION

This invention relates to friction braking systems and more particularly to new and improved arrangement of aircraft friction discs employing rotors and stators with separators therebetween having good heatsink qualities with noise dampening capabilities.

In brake assemblies which employ a plurality of brake discs alternately splined to the wheel and axle of an aircraft, it is important to provide means for dissipating the heat. It is also important to provide discs that can withstand the high temperature that are encountered when such brake discs are used in high speed landings. It was heretofore conventional to use steel discs for the rotary and stationary discs but carbon disc brakes replaced the metal discs due to their superior performance in withstanding the high heat build-up in such brakes. One disadvantage in the use of carbon discs is their propensity to vibrate and thereby generate noise. The present invention is operative to dampen vibration and noise while maintaining the desirable highly effective characteristics of the carbon composite disc brake.

SUMMARY OF THE INVENTION

The present invention is directed to a braking element that may be used in a multiple disc brake assembly having at least rotor and stator discs. The invention may be incorporated into either the rotor or stator discs or in both simultaneously. One of the stator or rotor discs consists of two annular disc members or elements separated by a separator disc but all of which are interconnected into an integral disc element. The separator disc is composed of a thin carbonaceous composite material such as graphite that is operative to reduce vibration and noise.

BRIEF DESCRIPTION OF THE DRAWINGS

FIG. 2 is a front elevational view of a portion of one of the split brake discs with portions broken away to show the carbonaceous interposed separator that is located between two annular split disc members.

FIG. 3 is an enlarged cross-sectional view of a portion of the split disc shown in FIG. 2, taken on line 3—3 of FIG. 2;

FIG. 4 is a perspective view of one of the separators for use between a pair of disc members to form a stator or rotor disc.

FIG. 5 is a perspective view of a clip used in the brake discs.

DETAILED DESCRIPTION

Figure 1:
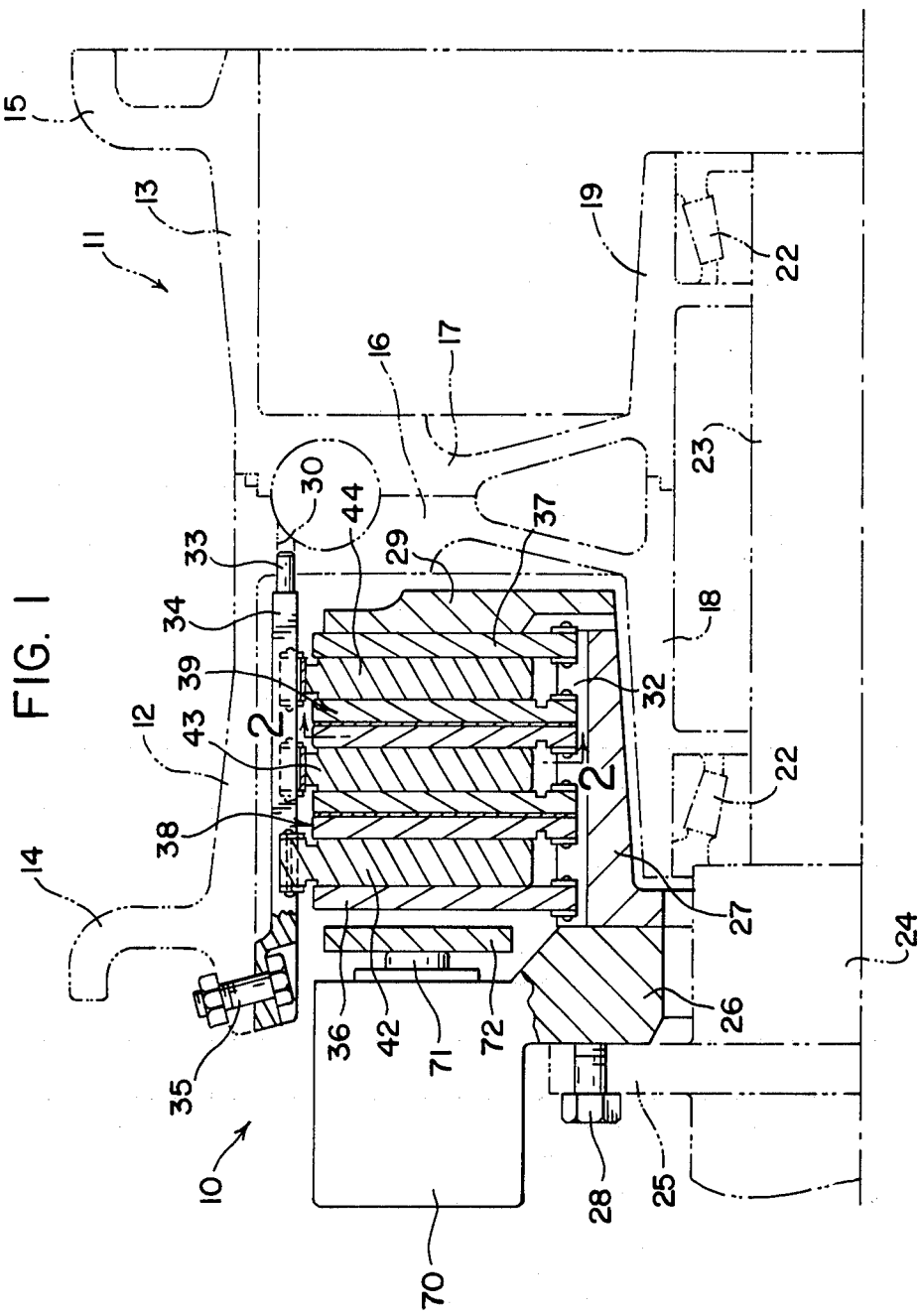
FIG. 1 is a fragmentary cross-sectional view of a brake assembly embodying the invention shown as mounted on an aircraft wheel installation in phantom lines.

Referring to the drawings, wherein like reference numerals designate like or corresponding parts throughout the several views, there is shown in FIG. 1 a friction brake mechanism 10 mounted on a cylindrical wheel 11 having matching wheel sections 12 and 13. Each of the wheel sections 12 and 13 has a rim member 14 and 15, web member 16 and 17, and hub members 18 and 19 respectively. The wheel sections 12 and 13 are fastened together by suitable bolts (not shown) disposed in aligned bores within web members 16 and 17.

The hub members 18 and 19 are supported for rotation on bearings 22 mounted on a nonrotatable axle member 23. Mounted on a boss 24 of axle member 23 is a torque flange 25. Torque flange 25 supports a torque frame member 26 which overlies boss 24. An elongated annular shaped torque tube 27 is suitably secured to the torque frame 26 and extends axially inwardly of torque frame 26 located between the wheel section 12 and the hub member 18. The torque flange 25, torque frame 26 and torque tube 27 are suitably fastened together such as by bolts 28 at circumferentially spaced positions around the flange 25.

The one end of torque tube 27, opposite to the end abuttingly contacting torque frame 26, has an annular and radially outwardly extending reaction plate or member 29. Plate 29 may be made integral with the torque tube 27 or may be made as a separate piece and suitably connected to the torque tube 27.

Torque tube 27 has a plurality of circumferentially spaced splines 32 which are axially extending. The upper end portion of web member 16 of wheel section 12 has a plurality of circumferentially spaced bores 30 (only one shown in FIG. 1) which receive the leg end 33 of key members 34. The outboard ends of the respective key members 34 are fastened by bolts 35 to the wheel rim member 14.

In lieu of the splines 32 and the fastening of the key members 34 by bolts 35, the inner periphery may be cast to provide a plurality of circumferentially spaced ribs which may be machined and then provided with a steel cap to provide an integral type rib or spline.

Spline members 32 support a pair of axially spaced nonrotatable end discs 36 and 37 and a pair of inner discs 38 and 39. All of such nonrotatable discs 36, 37, 38 and 39 have slotted openings at circumferentially spaced locations on the inner periphery for captive engagement by the spline members 32 as is old and well known in the art. Such discs 36, 37, 38 and 39 constitute the stator for brake 10.

Rotatable discs 42, 43 and 44 have a plurality of circumferentially spaced openings along their outer periphery for engagement by the corresponding key members 34 as is old and well known in the art thereby forming the rotor of the brake 10. All of the nonrotatable discs 36, 37, 38 and 39 and rotatable discs 42 through 44 are made of a suitable brake material such as a carbon composite friction material for withstanding high temperatures and providing a heat sink. The rotatable discs 42 is positioned between nonrotatable discs 36 and 38, the rotatable disc 43 is positioned between nonrotatable discs 38 and 39, and rotatable disc 44 is positioned between nonrotatable discs 37 and 39. The number of discs may be varied as is necessary for the application involved.

Discs 38 and 39 are similar in construction and only one disc will be described, it being understood that disc 39 and other similar additional discs (stators as well as rotors) may be used. Nonrotatable disc 38 is split into two plates or disc members 45 and 46 (FIG. 3) of substantially the same thickness, made from a carbon composite material, although there is no requirement as such except for convenience of assembling. Interposed between the disc members 45 and 46 is a thin vibration dampening disc member or separator disc 48 composed of a composite carbon or graphite material or high temperature composite. The thin disc member 48 as well as the disc members 45 and 46 are made from a carbon fibrous substrate having a coating of pyrolytic carbon which could also have a multiplicity of random carbon fibers. The carbon fibrous substrate can be made from wool, rayon, polyacrylonitrile and pitch. The substrate's thickness is controlled and is densified to the degree desired by controlled interstitial deposition os pyrolytic material as disclosed by U.S. Pat. Nos. 3,991,248 and 4,291,794. The process of producing a pyrolytic graphite coating on a substrate is described in U.S. Pat. No. 3,725,110. The instant invention is directed to the structure and construction of the stators and rotor elements per se and not to the process of making them which is described in the above referred to patents.

The disc members 45 and 46 have aligned slotted openings 50 (FIG. 2) at circumferentially spaced apart positions around the inner periphery of the disc members. If desired U-shaped drive clips 51 can be located in the slotted openings 50 to provide reinforcement to the walls of such slotted openings. The separator disc 48 similarly has a plurality of slotted openings 50' at circumferentially spaced apart positions around the inner periphery as shown in FIG. 4. The respective disc members 45 and 46 along with separator disc 48 could operate together as a unit without clips, however, such disc members 45 and 46 could be connected and held together as a unit by means of clips 51. Each clip 51 has a slot insert portion or bridging portion 52 that is adapted to fit within the respective slotted openings 50 and 50' of the disc members and the separator discs. Each clip 51 has spaced side sections 54 that fit tightly against the side walls of the openings 50 such that forces applied to the side sections 54 of the clips 51 are transmitted to the walls of the drive slots or openings 50. Each side of the drive clip has a pair of arms 55 and 56, each of which extends integrally from a side section of the clip. The pairs of arms 55 and 56 extend in opposite directions and substantially tangentially to the outer periphery of the disc 38 along the periphery of the respective disc members 45 and 46. The respective arms 55 and 56 have openings 58 which are aligned with similar bores in the disc members 45 and 46 as well as separator disc 48 to accommodate rivets 60 or other suitable fasteners to secure the arms 55 and 56 to the disc members 45 and 46 as well as securing the disc members 45 and 46 to the separator disc 48 to form integral stator and rotor brake discs.

Similar bearing members or clips and rivets may be used in the openings of the rotatable discs 42, 43 and 44 as well as in the openings in the nonrotatable disc 39 and the end discs 36 and 37 for sliding engagement on the key members 34 and on the spline members 32.

Vibration dampening separator disc 48 as shown in FIGS. 3 and 4 is relatively thin compared to the thickness of the disc members 45 and 46. As a specific example of the thickness of these members, the separator disc 48 is 0.050 of an inch 0.127 cm in thickness and each of the disc members 45 and 46 are 0.50 of an inch (1.27 cm) in thickness. In this instance, the separator disc 48 is approximately four and seventy-six one hundredths (4.76%) percent of the total thickness of the brake disc (rotor or stator).

In a typical brake rotor situation, the separator disc's thickness can vary from 0.025" to 0.100" while each disc members 45 and 46 can vary from ⅜ of an inch to one inch in thickness. The overall thickness of the separator disc in this instance can be varied from this range such that the separator disc's thickness could have a range of thickness from 0.005 inches to a maximum of 0.150 inches where the individual disc members 45 and 46 vary from ⅜ of an inch to ½ of an inch with the preferred separator range being from 0.005 of an inch to 0.075 of an inch. This latter range in thickness of the separator disc to the thickness of the overall brake disc (which is the two disc members 45, 46 and the separator disc 48) is (0.005/0.755) 0.66% to (0.075/1.075) 7%.

The following table lists the thicknesses of the separator disc to that of the respective disc members 45 and 46 with their corresponding ratio to more specifically illustrate the relative thinness of the elements.

| A. thickness of separator disc | B. thickness of a disc member | C. total thickness of separator disc & 2 disc members | D. ratio of A/C |
|---|---|---|---|
| .005" (.013 cm) | .375" (.952 cm) | .755 (1.918 cm) | .0066 |
| .005" (.013 cm) | .500" (1.270 cm) | 1.005 (2.552 cm) | .0100 |
| .025" (.064 cm) | .375" (.952 cm) | .775 (1.968 cm) | .0322 |
| .025" (.064 cm) | .500" (1.270 cm) | 1.025 (2.604 cm) | .0243 |
| .050" (.127 cm) | .375" (.952 cm) | .80 (2.032 cm) | .0625 |
| .050" (.127 cm) | .500 (1.270 cm) | 1.05 (2.667 cm) | .0476 |
| .075" (.190 cm) | .375" (.952 cm) | .825 (2.095 cm) | .0909 |
| .075" (.190 cm) | .500" (1.270 cm) | 1.075 (2.730 cm) | .0697 |
| .100" (.254 cm) | .375" (.952 cm) | .85 (2.159 cm) | .1176 |
| .100" (.254 cm) | .500" (1.270 cm) | 1.100 (2.794 cm) | .0909 |
| .150" (.381 cm) | .375" (.952 cm) | .900 (2.286 cm) | .1666 |
| .150" (.381 cm) | .500" (1.270 cm) | 1.150 (2.921 cm) | .1304 |

In addition to splitting the brake discs 38 and 39 the brake disc 36, 37 42, 43 and 44 may be split, which covers the splitting of the nonrotatable discs as well as the rotatable discs and have the vibration dampening separator discs 48 inserted therebetween.

During the braking action, the friction forces on the split nonrotatable discs 38 and 39 cause vibration of the disc members 45 and 46 however because the excitation is different instantaneously and locally on each disc member the response is different and microscale relative motion exists at the inner face between the disc members. This relative motion is resisted by the contact friction between the rotatable disc 42, 43, and 44 and the nonrotatable discs 36, 37, 38 and 39 and the split disc 45 and 46 as described with the separator therebetween constitutes a dampening force inhibiting the vibration of either disc members 45 or 46.

Vibration dampening and reduction in noise can be further increased by splitting the nonrotatable discs 37 and 38 into more than two disc members however this will decrease the effectiveness of the discs 37 and 38 as heat sinks. By providing the interface between the disc members 45 and 46 at the midpoint of the discs 37 and 38 little or no thermal effectiveness penalty is realized.

By alternating relatively thin separator discs 48 with the relatively thick discs 45 and 46 there is a reduction in noise obtained because the natural frequencies of adjacent parts are staggered and this reduces the resonance of the brake. Such thin layer of the separator disc 48 prevents the nesting together of the two adjacent disc members such as 45 and 46.

The actuating mechanism for the brake includes a plurality of circumferentially spaced cylinders 70 suitably connected to torque member 26. Within each of the cylinders 70 is a hydraulic piston connected to piston rod 71 operative to move the retractor plate 72 into and out of engagement with the nonrotatable disc 36. Retractor mechanisms old and well known in the art may also be employed in cooperation with the retractor plates for automatic adjusting or wear compensation.

In the operation of the brake mechanism, pressurized hydraulic fluid from a suitable source is introduced to the cylinders 70 to move their respective pistons, piston rods 71 and retractor plate 72 toward nonrotatable disc 36. Disc 36 slides along the spline members 32 and into abutting engagement with rotatable disc 42. Rotatable disc 42 slides along key members 34 into engagement with nonrotatable disc 38, which also is forced axially into engagement with rotatable disc 43 until all of the discs are in abutting engagement and under pressure one against the other and against the reaction plate 29 of torque tube 27.

During this period of brake disc engagement the friction forces among all the rotatable and non-rotatable discs cause vibration within the discs which is dampened by the separator disc 48. Such action correspondingly reduces the noise without sacrificing thermal effectiveness of the brake 10.

It will be apparent that, although a specific embodiment of the invention has been described in detail, the invention is not limited to such specifically illustrated and described construction since variations may be made without departing from the principles of the invention.

I claim:

1. In a multiple disc brake or clutch assembly having a plurality of discs, at least one of said discs having a pair of spaced annular disc members, a separator disc member interposed between said pair of disc members, said separator disc member is thin in cross-section relative to the cross-section of any one of said adjacent disc members and being operative to dampen vibration and reduce noise between said disc members, and said separator disc is a thin annular member less than one-tenth of the thickness of any adjacent disc member.

2. In a multiple disc brake or clutch assembly as set forth in claim 1 wherein said discs, disc members and separator discs are made from a carbonaceous material.

3. A disc brake assembly having a plurality of axially aligned brake discs; one of said discs having a pair of spaced disc members; each of said spaced disc members having a pair of planar spaced surfaces; a separator disc located between said disc members operative to dampen vibration in said disc members and reduce noise; said separator disc being substantially thinner than the total thickness of said disc member; and said separator disc and disc members are interconnected to form an integral unit.

4. A disc brake assembly as set forth in claim 3 wherein said separator disc is less than 15 percent of the total thickness of said one brake disc.

5. A disc brake assembly as set forth in claim 3 wherein said separator disc is less than 10 percent of the total thickness of said one brake disc.

* * * * *